United States Patent [19]
Nakata

[11] 3,920,885
[45] Nov. 18, 1975

[54] HIGH-VOLTAGE, COMPRESSED-GAS-INSULATED BUS
[75] Inventor: Roy Nakata, Pittsfield, Mass.
[73] Assignee: General Electric Company, Philadelphia, Pa.
[22] Filed: Mar. 14, 1975
[21] Appl. No.: 558,397

[52] U.S. Cl. .............................. 174/28; 174/99 B
[51] Int. Cl.² ........................................ H01B 9/04
[58] Field of Search ............ 174/28, 29, 16 B, 99 B, 174/88 B

[56] References Cited
UNITED STATES PATENTS

| 3,324,272 | 6/1967 | Shankle et al. | 174/28 X |
| 3,345,450 | 10/1967 | Spindle | 174/28 |
| 3,391,243 | 7/1968 | Whitehead | 174/28 |
| 3,515,909 | 6/1970 | Trump | 174/28 X |
| 3,573,341 | 4/1971 | Graybill et al. | 174/28 X |
| 3,585,270 | 6/1971 | Trump | 174/28 X |
| 3,652,778 | 3/1972 | Sakai | 174/28 |
| 3,715,532 | 2/1973 | Morva | 174/28 |

FOREIGN PATENTS OR APPLICATIONS
972,213 6/1959 Germany .............................. 174/28

Primary Examiner—Arthur T. Grimley
Attorney, Agent, or Firm—William Freedman; J. Wesley Haubner

[57] ABSTRACT

This high-voltage compressed-gas-insulated bus comprises a high voltage conductor, a tubular metal sheath surrounding the conductor, and an annular insulator surrounding the conductor for supporting the conductor within the sheath. On the exterior surface of the conductor there is a tubular coating of solid dielectric material that extends continuously along the conductor from locations spaced from the insulator to locations within the bore of the insulator. Within the bore there is a discontinuity in the coating that receives a portion of the insulator projecting from the bore. This projecting portion coacts with the coating to effectively key the insulator to the conductor. No voids are present between the coating and the bore and between the coating and the projecting portion.

2 Claims, 2 Drawing Figures

HIGH-VOLTAGE, COMPRESSED-GAS-INSULATED BUS

BACKGROUND

This invention relates to a high-voltage, compressed-gas-insulated bus and, more particularly, to insulating support means for the high-voltage conductor of such a bus.

The following references are of interest with respect to this invention: U.S. Pat. Nos. 3,345,450, Spindle, 3,515,909, Trump, and 3,585,270, Trump.

Typically, a bus of this type comprises a high-voltage conductor, a metal sheath at ground potential surrounding the conductor in radially-spaced relationship thereto, compressed insulating gas in the space between the conductor and the sheath, and annular insulators supporting the conductor within the sheath, each insulator having a bore for receiving the high-voltage conductor.

It has been recognized that the ability of such a bus to withstand voltage between the high voltage conductor and the sheath can be improved by providing the conductor with a thin coating of solid dielectric material.

Whether or not such a coating is present, a critical region from a dielectric strength viewpoint is the junction region between the bore of each support insulator and the high voltage conductor, especially in locations at the ends of bore. This is a highly stressed region that is often susceptible to corona initiation.

It has been proposed in Trump's U.S. Pat. No. 3,515,909 to reduce the chances for corona in this region by providing the conductor with a dielectric coating that extends along the conductor through the bore of the insulator. Trump emphasizes that his dielectric coating extends completely through the insulator bore without interruption.

My investigation of dielectric properties in the above described critical region indicates that it is not necessary that the coating be uninterrupted within the insulator bore. As long as the coating extends into the insulator bore substantially past its ends, equally satisfactory performance can be obtained whether the coating is continuous or interrupted within the bore.

SUMMARY

An object of my invention is to significantly reduce the chances for corona-initiation within the bore and at the ends of the bore of the above-described bus insulator by utilizing on the bus conductor an insulating coating so constructed that it can also function to key the insulator to the conductor.

In carrying out my invention in one form, I interrupt the coating within the bore and utilize the discontinuity in the coating to receive a portion of the insulator projecting from the bore. This projecting portion coacts with the coating to effectively key the insulator to the conductor. If the projecting portion is a metal grading ring, the discontinuity serves the additional important purpose of permitting good electrical contact to be made between the grading ring and the conductor, thus aiding the grading ring in performing its desired electric-field shaping function. No voids are present between the coating and the bore and between the coating and the projecting portion.

DETAILED DESCRIPTION OF PREFERRED EMBODIMENT

Figure 1:
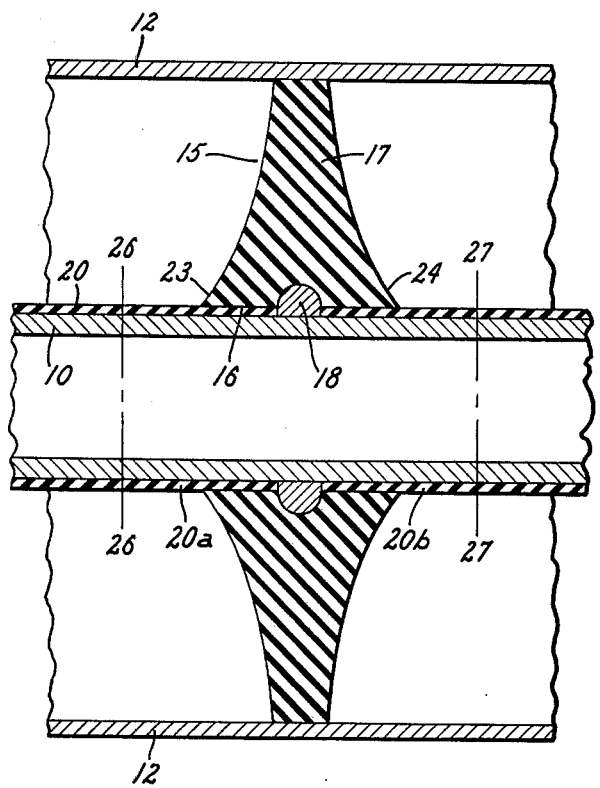
FIG. 1 is a sectional view of a portion of a bus embodying one form of my invention.

Referring now to FIG. 1, there is shown a conductor 10 normally at high voltage and a tubular metal sheath 12 surrounding the conductor 10 in radially-spaced relationship thereto. The space between conductor 10 and sheath 12 is filled with a compressed gas dielectric such as sulfur hexafluoride to provide a high dielectric strength between the parts 10 and 12.

For supporting the conductor within the sheath in coaxial relationship thereto, there is provided an annular insulator 15. This insulator comprises a generally disc-shaped body 17 having a bore 16 surrounding conductor 10 and spaced a short distance from the outer periphery of conductor 10. For reducing electrical stresses immediately adjacent the outer periphery of conductor 10 in the region of the insulator, the insulator is provided with a conventional grading ring 18 embedded in and integral with the body of the insulator and projecting radially inward from the bore 16 into snug-fit engagement with the outer periphery of conductor 10. This grading ring has an outer diameter substantially larger than the diameter of bore 16. Insulator 15 is mounted on conductor 10 before assembly of the bus simply by pressing the insulator together with its grading ring 18 onto the conductor until the insulator is located in the desired axial position on the conductor.

As mentioned hereinabove, the ability of a bus to withstand voltage between its high voltage conductor and its sheath can be improved by providing the conductor with a thin coating of solid dielectric material. In the bus of FIG. 1, such a coating is provided on conductor 10 as shown at 20. A critical region from a dielectric strength viewpoint is the junction region between the bore (16) of the support insulator and the high voltage conductor (10), especially in locations at the end of the bore where the bore intersects end faces 23 and 24 of the insulator. Typically, this junction region is a highly stressed region that is susceptible to corona initiation.

For reducing the chances for corona initiation in this junction region, I provide the coating 20 with a first portion 20a extending continuously along the conductor 10 from a first location (indicated by line 26–26) axially spaced from the insulator 15 at one side thereof, past the end face 23 to a region inside the bore 16. I also provide the coating 20 with a second portion 20b extending continuously from a second location (at line 27–27) axially spaced from insulator 15 at an opposite side thereof, past the end face 24 to a region inside bore 16. The coating 20 contains a discontinuity between these two portions 20a and 20b, and the grading ring 18 of the insulator fits within and fills this discontinuity.

No voids are present either between the coating portion 20a and the grading ring 18 or between coating portion 20b and grading ring 18. Additionally, no voids are present between the remaining interface of coating 20 and the bore 16.

Figure 2:
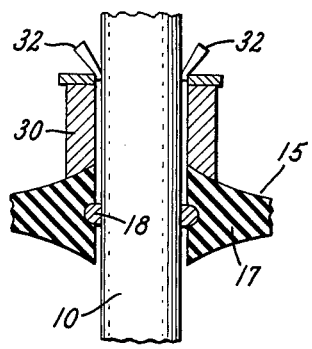
FIG. 2 illustrates a step in the manufacture of the bus of FIG. 1.

This void-free junction region is preferably obtained by injecting an appropriate resin, while still in an uncured liquid state, into the space between the conductor 10 and the bore 16 and then curing it into a hardened state. FIG. 2 shows one way of performing such an operation. A tubular mold 30 having a bore slightly larger than the conductor 10 is placed around the conductor in radially-spaced relationship to the conductor at one side of the insulator 15. The tubular mold has a lower face which intimately contacts insulator 15. The space within the mold and within bore 16 is suitably evacuated, and thereafter the liquid resin is injected via the injection ports 32, thus filling the space around conductor 10 within the mold bore and the insulator bore with resin, which, upon hardening, forms the coating portion 20a. The mold 30 is then removed, and a similar operation is performed at the opposite side of the insulator 15 to form the coating portion 20b. These coating portions 20a and 20b can be extended along the length of the conductor, if desired, in any suitable conventional manner.

The absence of voids between the coating and the insulator bore 16 and between the coating and the grading ring 18 plays an important role in preventing corona initiation in the junction region during operation of the bus.

Locating the ring portion 18 of the insulator 15 in the discontinuity of the coating 20 between portions 20a and 20b serves to anchor, or key, the insulator 15 in a fixed position on the conductor 10, desirably preventing it from shifting axially thereof. In addition, it is important that the grading ring 18 make a good contact with the conductor 10, and the presence of the discontinuity enables such good contact to be made. This good contact is needed to assure that the grading ring will have the same potential as the conductor 10 and will thus be able to shape the electric field as desired in the critical junction region.

After a pair of longitudinally-spaced insulators such as 15 have been mounted on the conductor 10, as above described, and the coating 20 has been formed thereon as above described, the resulting assembly is suitably mounted within the tubular sheath 12. The joint between the outer periphery of the insulators 15 is the sheath 12 can be of any suitable conventional design, the details of which constitute no part of the present invention.

Although I have illustrated the invention in connection with an annular insulator of a particular disc shape, it is to be understood that the invention is also applicable to other shapes of annular insulators, e.g., conical shapes such as shown in U.S. Pat. No. 3,652,778, Sakai and 3,610,858, Gruber et al.

While I have shown and described a particular embodiment of my invention, it will be obvious to those skilled in the art that various changes and modifications may be made without departing from my invention in its broader aspects; and I, therefore, intend in the appended claims to cover all such changes and modifications as fall within the true spirit and scope of my invention.

What I claim as new and desire to secure by Letters Patent of the United States is:

1. A high-voltage, compressed-gas insulated bus, comprising:
   a. a conductor normally at high voltage,
   b. a tubular metal sheath surrounding said conductor in radially-spaced relationship thereto.
   c. a tubular coating of solid dielectric material on the exterior surface of said conductor,
   d. an annular insulator surrounding said conductor for supporting said conductor within said sheath,
   e. said insulator having a bore that intimately surrounds said coating and end faces located at opposite ends of said bore,
   f. said coating having
      i. a first portion extending continuously along said conductor from a first location axially spaced from said insulator at one side thereof, past one of said end faces to a region inside said bore and
      ii. a second portion extending along said conductor continuously from a second location axially spaced from said insulator at the opposite side thereof, past the other of said end faces to said region inside said bore,
   g. said coating containing a discontinuity located between said first and second portions,
   h. said insulator having a portion projecting radially inwardly from said bore that fits within and fills said discontinuity so that no voids are present between said coating portions and said projecting portion of the insulator,
   i. the remaining interface between said insulator bore and said coating being free of voids.

2. The bus of claim 1 in which said projecting portion of said insulator is a metal grading ring embedded in the insulator and making good electrical contact with said conductor, said metal grading ring having a substantially larger outer diameter than the diameter of said bore.

* * * * *